Aug. 19, 1969      SHIH-MING HO      3,462,621

ELECTRODES FOR MAGNETOHYDRODYNAMIC DEVICES

Filed July 6, 1965

WITNESSES:

INVENTOR.
Shih-Ming Ho

BY

ATTORNEY

United States Patent Office 3,462,621
Patented Aug. 19, 1969

3,462,621
ELECTRODES FOR MAGNETOHYDRODYNAMIC DEVICES
Shih-Ming Ho, Pittsburgh, Pa., assignor to Westinghouse Electric Corporation, Pittsburgh, Pa., a corporation of Pennsylvania
Filed July 6, 1965, Ser. No. 469,669
Int. Cl. H02k 45/00; G21d 7/02
U.S. Cl. 310—11        9 Claims

ABSTRACT OF THE DISCLOSURE

A durable electrode structure for magnetohydrodynamic devices comprising a refractory oxide body containing a plurality of high temperature, corrosive resistant electrical conductors, the ends of which are disposed at different levels in the refractory body near one surface thereof, said surface to be exposed to a thermally ionized fluid stream.

---

This invention relates to long life electrode structures for magnetohydrodynamic devices, and particularly to an electrode that is able to withstand the erosive and oxidizing effects of high temperature plasmas while at the same time having good electrical conductance from its hot surface to its cold surface.

The conventional process of generating electrical power comprises moving metal conductors through a magnetic field. Generally, the energy conversion is from heat to mechanical energy to electrical energy. Electrical energy can also be generated by moving fluid conductors in a magnetic field. By such means thermal energy is directly converted into electrical energy. Such generating means are now commonly known as magnetohydrodynamic generators, usually abbreviated MHD. An MHD generator uses a thermally ionized working fluid, usually a combustion product gas which is seeded with an alkali metal to make the gas more conductive. The ionized gas is then passed through a transverse magnetic field. Current collecting electrodes are placed along the flow of ionized gas to collect the electrical current generated by movement of the electrically conducting gas in the magnetic field.

The general theory and operation of an MHD generator and electrode characteristics have been described in copending application Ser. No. 209,575, filed July 13, 1962, by Stewart Way and assigned to the same assignee as the present invention, and now U.S. Patent 3,275,860 issued Sept. 27, 1966. As disclosed in the application and patent, in order to obtain an efficient cycle of operation, it is necessary that the thermally ionized gas be maintained in a highly conductive state. Thus, the gas must be kept at a high temperature of the order of 2500° C. Using combustion product gases, which contain an appreciable fraction of oxygen, perhaps 5%, as well as carbon dioxide and water, due to disassociation, gives rise to the problem of electrode durability. This problem is present because most materials which are electrical conductors and which are able to stand high temperatures of 2200 to 2760° C. are also oxidizable. Additionally, these high temperature, corrosive gases flow through the MHD generating device at extreme velocities, in the order of 3000 feet per second. Thus, the current collecting electrodes are subject also to rapid and extensive erosion and wear.

The results from many prior screening tests indicate that almost all materials with high conductivity (namely metals) fail due to chemical instability in the environment of high temperature plasmas. The most promising materials, as far as stability is concerned, are the refractory single oxides such as magesium oxide and zirconium oxide. However, the electrical conductivities of all of the single oxides are too low to be suitable for current collecting electrodes. This general analysis logically leads to consideration of refractory oxide-metal combinations. After the evaluation of many combinations of different metals with oxides, a metal wire-zirconia composite, with the metal selected from the group consisting of palladium, rhodium, platinum and iridium, was found to be best suited for the MHD environment. This combination of materials met the two main requirements that control the utility and efficiency of electrode materials in MHD generators, namely, high electrical conductance, and stability to erosive and oxidizing high temperature plasmas.

It is therefore an object of the present invention to provide new and improved electrode structures for use in magnetohydrodynamic thermal to electrical energy conversion apparatus and a method of making the electrode.

It is another object of the invention to provide corrosive, erosive resistant electrode structures for magnetohydrodynamic devices.

It is yet a further object of this invention to provide long-lived electrode structures for use in magnetohydrodynamic devices that have improved electrical current conducting characteristics.

In general, the present invention provides a durable electrode structure comprising a refractory oxide body (preferably zirconia) containing a plurality of high temperature, corrosive resistant wire conductors, the ends of which are disposed at different levels in the body near the working surface thereof exposed to a thermally ionized gas stream.

The objects of the invention will become more apparent when considered in view of the following specification and drawings, in which.

Figure 1:
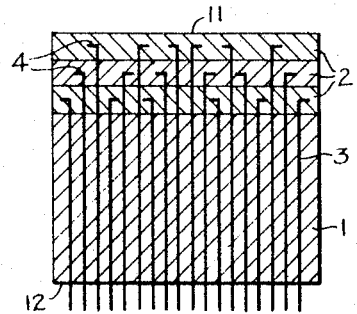
FIGURE 1 is a ghost side view of the electrode showing the metal conductors disposed in the electrode.

In the figures, like reference numerals refer to like parts. In FIG. 1 there is shown an electrode structure which comprises a body 1 of zirconia having a plurality of zirconia layers 2 bonded thereto. A plurality of spaced metal conductors 3 are embedded in body 1 and extend through the body into layers 2, conductors 3 being substantially perpendicular to the external surface 11. The opposite ends of conductors 3 extend beyond surface 12 where they may be joined for connection to appropriate circuits external of the electrode. Surface 11 is the hot working (current collecting) surface of the electrode that will be in contact with high velocity gas plasmas that form the thermally ionized working fluid in MHD devices. Surface 12 forms the cold end of the electrode that will be located away from the working fluid.

As previously mentioned, the single oxides are not good electrical conductors though they can withstand the high temperatures and corrosive characteristics of the MHD gas plasmas. In order to provide electrode body 1 and layers 2 with electrical current conducting qualities, metal conductors 3 extend through body 1 and into zirconia layers 2 and to a plane close to the hot, current collecting surface 11 without penetrating the surface. That portion of refractory layer 2 disposed over the ends of conductors 3 protects the conductors from oxidizing effects of the hot gas plasmas.

In order to increase the conductivity from the plane of hot surface 11 to the ends of the conductors adjacent thereto, conductors 3 are provided with L-shaped ends 4 as shown in FIG. 1. The L-shape increases the end surface area of conductors 3 thus increasing the current collecting potential of conductors 3, thereby making the overall electrode structure a much more effective conductor. Current flow from surface 11 through the zirconia material to the first group of L-shaped conductor ends 4 is made possible by the high temperatures in the MHD device; that is, the current conducting qualities of zirconia increase with an increase in temperature. Away from hot surface 11, the electrical resistance of the electrode body would be prohibitive without the use of conductors 3.

With the use of a plurality of zirconia layers and the embedded L-shaped conductors, the life of the electrode can be extended should the first layer fail because of ablation or erosion. Though three layers are shown in the drawing, it should be understood that the invention is not limited thereto. With the failure of the first layer, the second layer takes over the task of collecting the electrical current developed within the magnetic field in the MHD generating duct.

L-shaped conductor ends 4 are disposed in the second layer 2 and below the plane of the first group of L-shaped ends at the same distance the first group of L-shaped ends are disposed from working surface 11. Therefore, should surface 11 be worn down to the plane of the first group of conductor ends 4, the second group of conductor ends will be located in the refractory layer at the proper distance from said plane to take up the function of collecting current developed in the ablated surface. With the wearing away of the second surface, the third group of L-shaped ends stands ready as current collecting means, and so on until the electrode is finally worn out. In the meantime all groups of ends 4 serve as electrical current collecting means within the body of the electrode, since current will flow within all layers in varying degrees while the electrode is in use.

With such a structure it becomes readily apparent that the electrode of this invention is extremely efficient as a current collecting means and at the same time is a very durable, long-lasting electrode, making it well suited for use in MHD devices.

Figure 2:
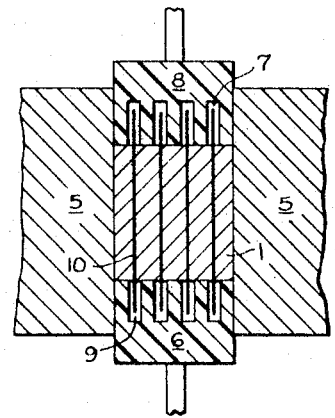
FIG. 2 is a cross sectional view of a portion of the mold for forming the electrode.

FIG. 2 shows a suitable means that may be used to manufacture the electrode shown and described in FIG. 1. Reference numeral 5 denotes a cross sectional view of the main portion of a press means which may take the form of a stainless steel cold press mold or other suitable means with plungers 6 and 8 disposed in the main portion 5 of the mold. Plungers 6 and 8 may be made from two pieces of acrylic-plastic material. Both plungers have a plurality of vertical tunnels 7 and 9, only four of which are shown.

To fabricate the electrode, plunger 8 is removed from the mold and a refractory powder, such as zirconia powder, is disposed in the mold above plunger 6. A plurality of metal wires 10, which may be made of nickel or other hard metals, are then inserted in the powder material and plunger 8 is reinserted in the mold and used to press the powder to form a relatively solid body 1 of refractory material. Plunger 8 is then removed and approximately a third of the metal wires 10 are removed and replaced with high temperature, corrosive-resistant wires 3 having L-shaped ends 4 as shown in FIG. 1. The nickel wires (if nickel is used) are approximately the same diameter as the tunnels in the plunger and can be about three inches long. The wires with L-shaped ends are of the same diameter as the nickel wires and tunnels. The L-shaped ends of the wires extend immediately above the top surface of the pressed refractory body and the other ends of the wires extend down through the body and out the opposite end, into tunnels provided in plunger 6.

A layer of zirconia powder is now poured over the top surface of the main body and around the L-shaped ends of the wires. Plunger 8 is again inserted in the mold and the layer pressed around the ends of the wires. Plunger 8 is again removed, approximately a third more nickel wires are replaced with L-shaped wires, a layer of powdered zirconia is again placed around the newly-exposed ends of the wires, plunger 8 is again inserted in the mold and the layer pressed. Plunger 8 is removed for the final disposition of the third layer of refractory material after the remaining nickel wires are removed and replaced with the L-shaped wires. It is understood that three layers of refractory material are shown only for purposes of illustration; more or less layers may be used. After the final layer has been pressed around the L-shaped conductors, the specimen is removed from mold 5 and sintered in an atmosphere of air at about 1500° C. for approximately one hour.

With the pressing of each layer, the pressure applied must be of such a degree that the plane of each group of L-shaped conductors will be at a proper distance from the adjacent plane of L-shaped conductors that insures the efficient collection of electrical current developed in the refractory layers. Thus, allowance for further compression of the first layers must be made with the subsequent pressing of additional layers. The final pressing of the last layer of refractory material added also determines the thickness between hot surface 11 and the last layer of L-shaped conductors. The pressure used in the final application was of the order of 9000 p.s.i. and the thickness was approximately ¼ of an inch using zirconia powder as the refractory material and platinum wires for the electrical conductors.

Figure 3:
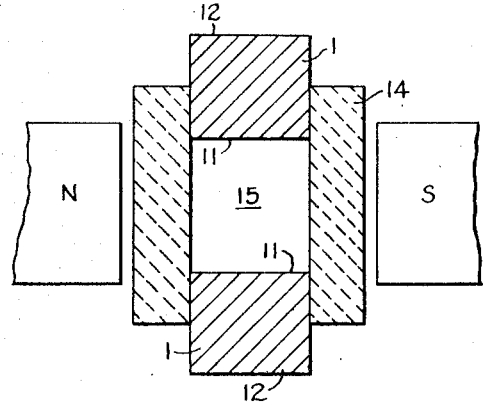
FIG. 3 is a diagrammatic cross sectional view of a typical MHD generator.

FIG. 3 illustrates a conventional MHD arrangement having an elongated rectangular fluid passage or duct 15 extending into the plane of the paper. Electrodes 1 are disposed in duct 15 so that hot working surfaces 11 are exposed to the thermally ionized fluid flowing in the duct, and are connected to a load circuit (not shown) via conductors 3 shown in FIG. 1 extending from the cold surface 12 of electrode 1. Refractory wall portions 13 and 14 may be used to support the electrodes and to form duct 15 in conjunction with the electrodes. Duct 15 is disposed between pole pieces of a suitable magnet to provide a transverse magnetic field in the duct and to the flow of the working fluid. Thus, as an electrically conducting working fluid passes through duct 15 and the magnetic field a current is generated which is collected by electrodes 1.

It is apparent from the above description that a novel electrode has been disclosed that is particularly useful in MHD devices. The multi-layer zirconia structure with L-shaped conductors embedded therein, as described, provides a durable electrode surface with excellent electrical current conducting qualities that makes it well suited for high temperature, corrosive and erosive environments such as encountered in MHD generators. Long-life electrodes, in turn, reduce repair, maintenance and MHD generator shut-down costs.

Though the present invention has been described with a certain degree of particularity, it should be understood that the present disclosure has been made only by way of example and that numerous changes in the details of construction and the arrangement of parts may be made by those skilled in the art. For example, the size and shape of the electrode is limited only by the requirements of MHD devices. Similarly, though the term wire has been used in the description, other words would describe the current carrying conductors equally as well, such as rods or filaments. Thus the invention is not limited to the specific arrangement shown and described, but is intended to include all modifications which fall within the spirit and scope of the invention.

I claim as my invention:

1. An electrode for an energy conversion device operative with a flow of thermally ionized fluid comprising a main body of zirconia with a plurality of zirconia layers disposed on one surface of the main body, a plurality of conductors disposed in the body, the ends of the conductors being L-shaped and extending into the plurality of layers, the conductors being made of a metal selected from the group consisting of palladium, rhodium, platinum and iridium.

2. An electrode for an energy conversion device with a flow of thermally ionized working fluid comprising a pressed body of refractory material having a plurality of tunnels extending therethrough and along its axial length, a plurality of elongated metal conductors contained in the tunnels, a plurality of layers of refractory material pressed on one end of the body for contact with the working fluid with the ends of the plurality of conductors extending into the respective refractory layers.

3. The electrode of claim 2 in which the ends of the metal conductors extending in the refractory layers are L-shaped.

4. The electrode of claim 2 in which the metal conductors extend beyond the end opposite the refractory layers for purposes of connecting to an external circuit.

5. The electrode of claim 2 in which the last refractory layer is pressed under a pressure of about 9000 p.s.i.

6. The electrode of claim 2 wherein the refractory material is zirconia and the metal conductors are platinum.

7. In an energy conversion apparatus operative with a flow of thermally ionized fluid, a zirconia electrode having a surface exposed to said fluid, said electrode having a plurality of conductors with L-shaped ends disposed at different levels therein, said conductors being made of a metal selected from the group consisting of palladium, rhodium, platinum and iridium.

8. A method of making a high temperature electrode comprising the steps of pressing a body of refractory powder around a plurality of wire conductors, replacing the conductors after the pressing step with high temperature, corrosive resistant conductors having L-shaped ends, pressing additional layers of refractory material around the L-shaped ends and sintering the electrode structure in an atmosphere of air at about 1500° C. for approximately one hour.

9. The method of claim 8 wherein the last layer of refractory material is pressed under a pressure of about 9000 p.s.i.

No references cited.

J D MILLER, Primary Examiner

DAVID X. SLINEY, Assistant Examiner

U.S. Cl. X.R.

313—311